FIG. I

INVENTORS EDWARD R. BLANCHARD
WILLIAM G. MARANCIK
BY
Jonathan Plowit
ATTORNEY

United States Patent Office 3,428,501
Patented Feb. 18, 1969

3,428,501
MIXTURE OF OZONE AND OXYGEN CONTAINING A FLUORINE ADDITIVE
Edward R. Blanchard, Summit, and William G. Marancik, Basking Ridge, N.J., assignors to Air Reduction Company, Incorporated, New York, N.Y., a corporation of New York
Filed July 18, 1966, Ser. No. 567,345
U.S. Cl. 149—1          8 Claims
Int. Cl. C06b *15/00;* B01f *3/02*

ABSTRACT OF THE DISCLOSURE

This invention relates to a solubilized and stabilized liquid mixture containing ozone, oxygen, and an additive taken from the class consisting of $F_2$ and $OF_2$.

---

This invention relates to the improvement in the preparation of liquefied mixtures of ozone and oxygen so as to have a single liquid phase at —183° C.

Liquefied ozone and oxygen are not completely miscible at —183° C. or below.

It is important that liquid ozone and liquid oxygen be miscible in all proportions since the liquid mixture is an excellent rocket fuel if it is completely solubilized; that is, made a solution in one phase. The prior art teaches the addition of fluorine to an oxygen-ozone solution in order to stabilize the mixture against explosive decomposition; that is, make it safer in preparation and for handling. For example, Patent No. 2,876,077 discloses introduction of fluorine into a liquefied ozone-oxygen mixture in very small proportions; that is, about 0.1% by volume. The addition of $CClF_3$ (Freon 13) previously has been used to produce solubilization. However, $CClF_3$ being inert has the disadvantage of causing a decrease in the specific impulse obtained from the mixture. That disadvantage is not encountered in the introduction of $F_2$ or $OF_2$ according to our invention.

It is an object of our invention to effect solubilization of a liquefied oxygen and ozone mixture.

It is further an object of our invention to effect solubilization of an oxygen and ozone mixture at a temperature of about —183° C.

It is further an object of our invention to effect solubilization of an oxygen and ozone mixture at a temperature of about —183° C., the temperature of liquid oxygen at atmospheric pressure, and to additionally stabilize the solubilized mixture.

These and other objects and advantages will become more apparent upon examination of the following detailed description.

We have found that the addition of relatively small percentages of fluorine to an ozone-oxygen mixture, but in substantially and significantly higher proportions than the introduced quantities of fluorine for stabilization against explosive decomposition, causes complete miscibility of the component of the mixture.

Figure 1:
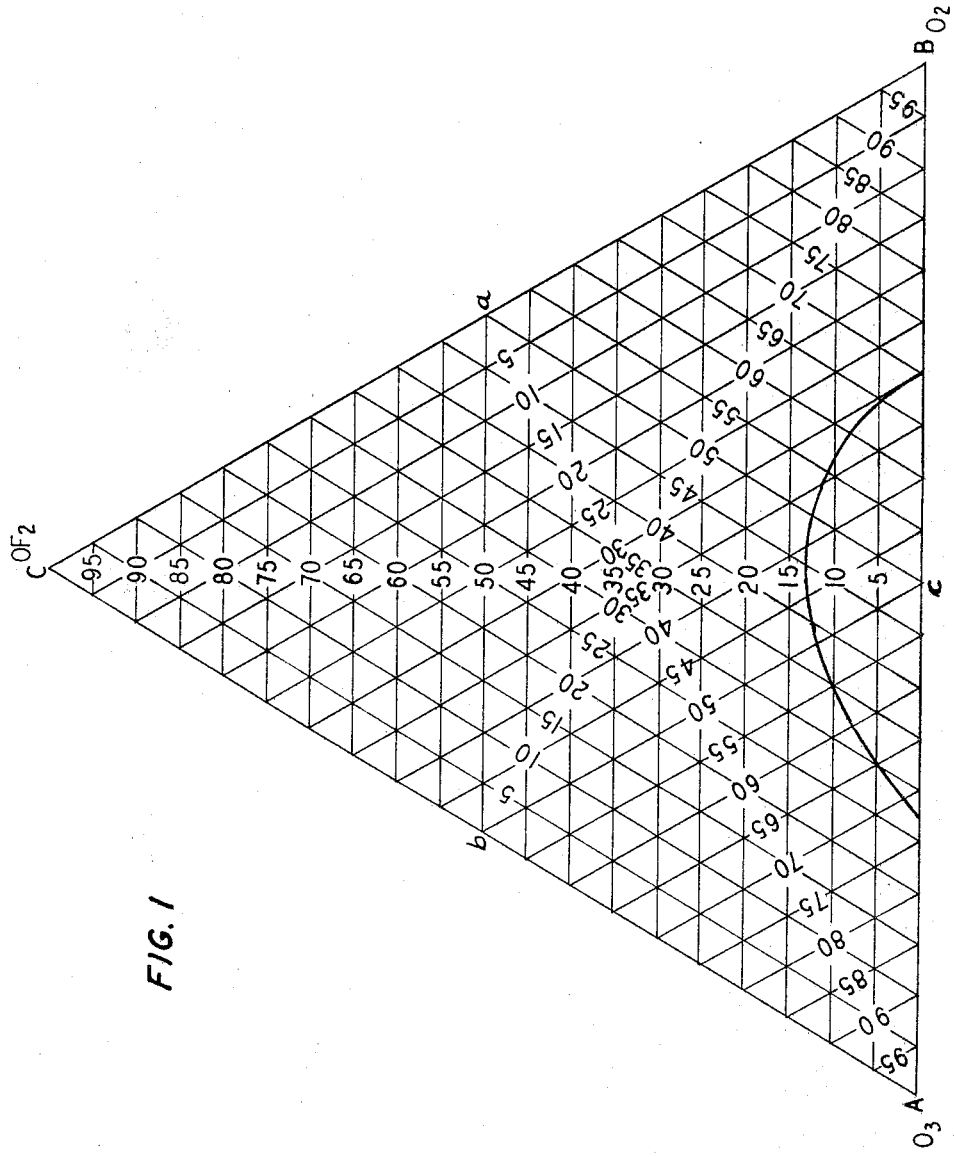
Figure 2:
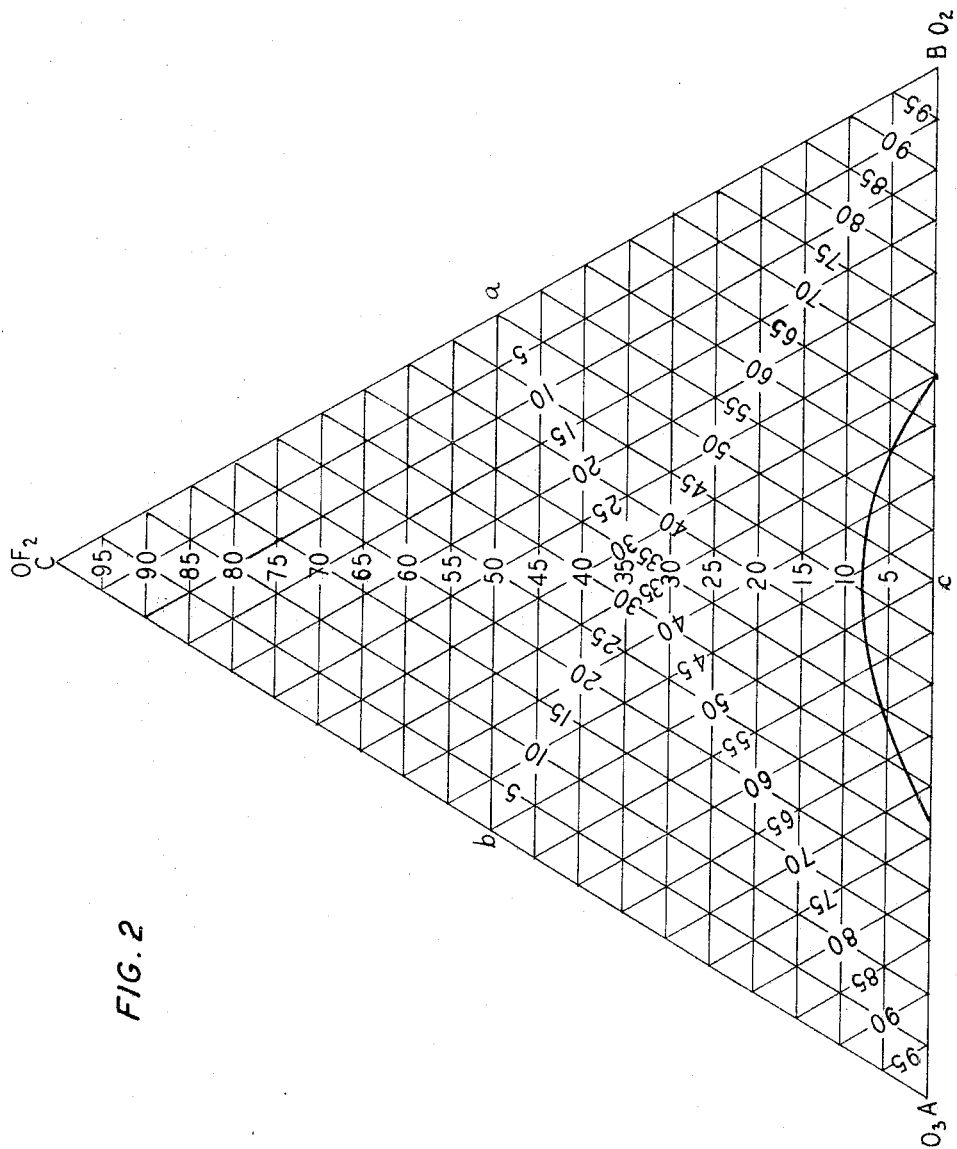

The invention will now be described in relation to the following figures:

FIGURE 1 and FIGURE 2 show triangular phase diagrams illustrating the principles of our invention.

Ozone-oxygen mixtures with overall compositions in the range between 30% and 70% by weight ozone form two liquid phases at —183° C. As shown in the triangular phase diagram of FIGURE 1, the minimum amount of fluorine required (more may be used) to solubilize a $O_3$–$O_2$ solution varies according to the ozone-oxygen ratio in the mixture. However, it can be seen, for example, from the curve derived from our experimental data that the approximate minimum amount of $F_2$ required is about 13% when there is about 43% ozone in the three component ozone-oxygen fluorine mixture. That minimum is illustrated on the curve at A.

All of the $O_3$–$O_2$–$F_2$ mixtures represented by points on or above the curve exhibit only one liquid phase (i.e. are solubilized) at —183° C. It should be noted that a minimum fluorine concentration required for solubilization, as indicated by a point on the crescent curve, holds only for the particular $O_3$–$O_2$ ratio given by the point on the $O_3$–$O_2$ coordinate lying vertically under the point on the crescent curve.

The figures which were used to arrive at the curve of FIGURE 1 (and which are the direct result of the experimentation of applicants) are presented hereinbelow in Table I.

TABLE I

| Percent $O_3$ | Percent $O_2$ | Percent $F_2$ | No. of Phase |
|---|---|---|---|
| 49.5 | 50.5 | --------- | 2 |
| 49.0 | 50.0 | 1.0 | 2 |
| 48.4 | 47.5 | 2.1 | 2 |
| 47.6 | 48.6 | 3.8 | 2 |
| 46.4 | 47.5 | 6.1 | 2 |
| 45.8 | 46.8 | 7.4 | 2 |
| 44.6 | 45.6 | 9.8 | 2 |
| 43.5 | 44.4 | 12.1 | 2 |
| 43.0 | 44.0 | 13.0 | 1 |
| 55.3 | 44.7 | --------- | 2 |
| 53.7 | 43.3 | 3.0 | 2 |
| 52.2 | 42.1 | 5.8 | 2 |
| 51.1 | 41.2 | 7.7 | 2 |
| 50.5 | 40.7 | 8.8 | 2 |
| 49.5 | 39.9 | 10.6 | 2 |
| 48.9 | 39.5 | 11.6 | 2 |
| 48.4 | 39.1 | 12.5 | 1 |
| 40.2 | 59.8 | --------- | 2 |
| 38.7 | 57.6 | 3.65 | 2 |
| 38.0 | 56.6 | 5.39 | 2 |
| 37.4 | 55.6 | 7.04 | 2 |
| 36.9 | 54.9 | 8.18 | 2 |
| 36.5 | 54.3 | 9.29 | 2 |
| 36.0 | 53.6 | 10.35 | 2 |
| 35.0 | 52.0 | 11.41 | 1 |
| 64.1 | 35.9 | --------- | 2 |
| 62.2 | 34.8 | 2.95 | 2 |
| 60.4 | 33.8 | 5.78 | 2 |
| 59.6 | 33.3 | 7.03 | 1 |

It will be noted that the systems in Table I composed of two liquid phases all fall under the crescent shaped curve, while the single phase systems (solubilized) all fall on and above the curve.

The triangular diagram of FIGURE 2, in a like manner to that described with relation to FIGURE 1, shows the amounts of $OF_2$ required to solubilize various $O_3$–$O_2$ mixtures. It can be see, for example, at B that the approximate minimum of $OF_2$ required is about 8% when there is about 45% ozone in the ozone-oxygen $OF_2$ solution. The curve of FIGURE 2 was arrived at through the plotting of experimental data in the same manner as described in relation to FIGURE 1. Again, the two phase systems fall under the curve, while the single phase (solubilized) systems fall on or above the curve.

The addition of fluorine suggested in the patent mentioned previously will not produce the solubilization that we have discovered, although it may produce the stabilization referred to in the patent. The unexpected solubilization resulting from the addition of fluorine described in the preceding paragraphs results only when fluorine is added at, or in excess of, the quantities described above. Such fluorine addition will serve to stabilize the single phase mixture as well as solubilize the mixture. As discussed earlier, this solubilizing in addition to stabilizing, is critical in the demands of rocket technology and results from the addition of the $F_2$ or $OF_2$ in excess of the minimum quantities set forth in this discolsure. This introduction of $F_2$ or $OF_2$ in excess of the percentage set forth serves to increase the solubility of ozone in oxygen without decreasing the specific impulse of the solubilized mixture because fluorine or oxygen difluoride are in themselves excellent high energy oxidizers.

Although the above description of our invention has been set forth with reference to particular details of process and method, including particular materials and percentages, it is intended that the invention only be limited by the scope of the following claims.

We claim:

1. A method of solubilizing a mixture of liquefied ozone and oxygen at a temperature of about $-183°$ C., comprising the step of introducing to said mixture a fluorine additive taken from the class consisting of fluorine and $OF_2$, in the approximate amount represented by points on or above the curves of the triangular phase diagrams of FIGURES 1 and 2, respectively.

2. A method of solubilizing a mixture of ozone and oxygen at a temperature of about $-183°$ C., comprising the step of introducing to said mixture fluorine in the approximate amount represented by points on or above the curve of the triangular phase diagram of FIGURE 1.

3. A method of solubilizing a mixture of ozone and oxygen at a temperature of about $-183°$ C., comprising the step of introducing to said mixture $OF_2$ in the approximate amount represented by points on or above the curve of the triangular phase diagram of FIGURE 2.

4. A solubilized and stabilized liquid mixture containing from about 30% to about 70% by weight ozone, oxygen and a fluorine additive taken from a class consisting of fluorine and $OF_2$.

5. A single phase solution comprising about 43% by weight ozone, about 44% by weight oxygen, and about 13% by weight fluorine.

6. The mixture of claim 4 in which the amount of the fluorine additive is represented by points on or above the curves of the triangular phase diagrams of FIGURES 1 and 2, respectively.

7. A single phase liquid solution comprising ozone and oxygen in amounts which would normally separate into two phases and fluorine in amounts represented by points on or above the curve of the triangular phase diagram of FIGURE 1.

8. A single phase liquid solution comprising ozone and oxygen in amounts which would normally separate into two phases and $OF_2$ in amounts represented by points on or above the curve of the triangular phase diagram of FIGURE 2.

References Cited

UNITED STATES PATENTS

| | | | |
|---|---|---|---|
| 3,134,647 | 5/1964 | Churchill | 23—222 |
| 3,134,648 | 5/1964 | Chiras | 149—1 X |
| 3,170,282 | 2/1965 | Kirshenbaum et al. | 149—1 X |
| 3,235,335 | 2/1966 | Churchill | 149—1 X |
| 3,260,627 | 7/1966 | Logan et al. | 149—1 |
| 3,260,628 | 7/1966 | Logan et al. | 149—1 |
| 3,260,629 | 7/1966 | Logan et al. | 149—1 |
| 3,260,630 | 7/1966 | Logan et al. | 149—1 |
| 3,282,750 | 11/1966 | Hemstreet | 149—1 |
| 3,284,367 | 11/1966 | Mahieux | 252—364 |

BENJAMIN R. PADGETT, Primary Examiner.

S. J. LECHERT, Assistant Examiner.

U.S. Cl. X.R.

252—364